(12) United States Patent
Krogh et al.

(10) Patent No.: US 8,148,868 B2
(45) Date of Patent: Apr. 3, 2012

(54) SLIP RING ASSEMBLY WITH COOLING

(75) Inventors: Lars Krogh, Egå (DK); Steen Bjerg Lauridsen, Kolding (DK)

(73) Assignee: Vestas Wind Systems A/S, Aarhus N (DE)

( * ) Notice: Subject to any disclaimer, the term of this patent is extended or adjusted under 35 U.S.C. 154(b) by 0 days.

(21) Appl. No.: 13/125,703

(22) PCT Filed: Sep. 28, 2009

(86) PCT No.: PCT/DK2009/050250
§ 371 (c)(1),
(2), (4) Date: May 10, 2011

(87) PCT Pub. No.: WO2010/048957
PCT Pub. Date: May 6, 2010

(65) Prior Publication Data
US 2011/0198965 A1   Aug. 18, 2011

Related U.S. Application Data

(60) Provisional application No. 61/197,365, filed on Oct. 27, 2008.

(30) Foreign Application Priority Data

Oct. 27, 2008 (DK) .................. 2008 01476

(51) Int. Cl.
*H02K 9/28* (2006.01)

(52) U.S. Cl. ...................... 310/227; 310/232

(58) Field of Classification Search .............. 310/227, 310/232
See application file for complete search history.

(56) References Cited

U.S. PATENT DOCUMENTS 3,564,315 A * 2/1971 Barton et al. ............. 310/227
(Continued)

FOREIGN PATENT DOCUMENTS
DE          206753       2/1909
(Continued)

OTHER PUBLICATIONS

Steffen Hostrup Larsen; 1st Technical Examination Report issued in priority Denmark Application No. PA 2008 01476; Apr. 28, 2009; 4 pages.; Denmark Patent and Trademark Office. Steffen Hostrup Larsen; Denmark Search Report issued in priority Denmark Application No. PA 2008 01476; Apr. 23, 2009; 1 page; Denmark Patent and Trademark Office.
Rafael Sedlmeyer; International Search Report issued in priority International Application No. PCT/DK2009/050250; Jan. 29, 2010; 2 pages; European Patent Office.

(Continued)

*Primary Examiner* — Dang Le
(74) *Attorney, Agent, or Firm* — Wood, Herron & Evans, L.L.P.

(57) ABSTRACT

The present invention relates to a slip ring assembly for providing electricity to or from a rotor rotating in relation to a stator in a generator or an electrical motor. The slip ring unit rotates around a centre axis and has at least one first slip ring with an outer surface, a diameter, and a width. Also, the assembly has at least one conductive means, such as a brush, having conductive contact with the surface of the slip ring, and a housing in which the slip ring unit and the conductive means are situated. Furthermore, the assembly has a suction means in connection with the housing for suction of gas from within the housing out through a suction outlet in the housing. In addition, the housing has a suction inlet which is connected with a guiding means. The guiding means has an aperture facing the slip ring surface, and the aperture is positioned at a predetermined distance from the surface of the slip ring so that the gas is able to cool the surface of the slip ring. Also, the invention relates to a generator and a wind turbine having such a slip ring assembly.

22 Claims, 4 Drawing Sheets

U.S. PATENT DOCUMENTS

2004/0100159 A1  5/2004  Rehder et al.

FOREIGN PATENT DOCUMENTS

| EP | 1 768 235 | 3/2007 |
|----|-----------|--------|
| FR | 350.275 | 12/1905 |
| GB | 317.424 | 8/1929 |
| GB | 2 010 021 | 6/1979 |
| JP | 6-197496 | 7/1994 |

OTHER PUBLICATIONS

Rafael Sedlmeyer; International Preliminary Report on Patentability issued in priority International Application No. PCT/DK2009/050250; Jan. 17, 2011; 7 pages; European Patent Office.

Steffen Hostrup Larsen; 2nd Technical Examination Report issued in priority Denmark Application No. PA 2008 01476; Feb. 24, 2010; 2 pages; Denmark Patent and Trademark Office.

* cited by examiner

SLIP RING ASSEMBLY WITH COOLING

FIELD OF THE INVENTION

The present invention relates to a slip ring assembly for providing electricity to a rotor which is able to rotate in relation to a stator in a generator or an electrical motor, the slip ring assembly comprising a slip ring unit rotating around a centre axis and having at least one first slip ring with an outer surface, at least one conductive means having conductive contact with the surface of the slip ring, and a housing in which the slip ring unit and the conductive means are situated. Furthermore, the invention relates to a generator and a wind turbine comprising such a slip ring assembly.

BACKGROUND ART

A wind turbine converts wind power into electrical energy through a generator driven by the blades of the wind turbine under windy conditions. In some wind turbines, the generator comprises a stator and a rotor both having multiphase windings, such as a double-fed induction generator, a cascade-regulated generator, an induction or a synchronic generator, or even a DC generator.

When having a rotor rotating in relation to a stator of a generator, electricity has to be transferred to or from the rotor. Electricity may be transferred by means of a slip ring assembly also called a rotary electrical interface, rotating electrical connector, collector, or swivel or electrical rotary joint, enabling the rotor to receive or return electricity while rotating in relation to the stator. When having a rotor with a multiphase winding, a control system within the wind turbine is able to regulate the frequency, so that the wind turbine produces at a predetermined frequency, e.g. approximately 50 Hz.

Typically, the slip ring assembly comprises a rotational slip ring unit rotating with the rotor and having conductive rings or bands. Furthermore, the slip ring assembly comprises brushes having sliding contact with the rings for transferring of electricity to the rotor. Thus, the electricity is transferred from the slip ring unit to the rotor windings in order to control the electrical field in the generator. The electricity is transferred to the slip ring unit by means of brushes brushing against the conductive rings, typically three conductive rings—one for each electrical phase. When the brushes brush against the rings, heat is generated due to the friction.

Tests have shown that the wear on the brushes can be substantially reduced if the surface of the brushes facing the rings is cooled down during the conduction of electricity. Replacing abraded brushes in a wind turbine is very costly and thus there is a need for increasing the service life of the brushes.

Many attempts to cool the brushes have been developed. One solution is shown in JP-53116406-A, in which air is led in through the centre of rotation and past the brushes before exiting the housing again. However, by blowing air into the housing of the slip ring assembly, the dust released from the brushes is spread to the generator where the dust has a harmful effect on the function of the slip ring.

In other solutions, the air is sucked out of the housing reducing the risk of the granite dust to be spread within the housing. However, the cooling is not very efficient and thus does not substantially increase the service life of the brushes.

SUMMARY OF THE INVENTION

An object of the present invention is, at least partly, to overcome the above disadvantages and drawbacks of the prior art and to provide an improved slip ring assembly with a more efficient cooling than known from prior art solutions so that wear on the brushes are substantially reduced.

An additional object is to provide an improved wind turbine which is able to cool the surface of the brushes facing the slip ring of the slip ring assembly positioned for controlling the rotation and/or transferring electricity to the rotor in the generator.

The above objects, together with numerous other objects, advantages, and features, which will become evident from the below description, are accomplished by a solution in accordance with the present invention by a slip ring assembly for providing electricity to or from a rotor rotating in relation to a stator in a generator or an electrical motor, comprising:
- a slip ring unit rotating around a centre axis and having at least one first slip ring with an outer surface, a diameter, a periphery and a width,
- at least one conductive means having conductive contact with the surface of the slip ring,
- a housing in which the slip ring unit and the conductive means are situated,
- a suction means in connection with the housing for suction of gas from within the housing out through a suction outlet in the housing and causing a negative pressure within the housing, wherein the housing has an suction inlet which is connected with a guiding means, the guiding means has an aperture facing the slip ring surface, and the aperture is positioned at a predetermined distance from the surface of the slip ring so that the gas is able to cool the surface of the slip ring.

When the gas is sucked through the guiding means, it is directed to flow past the surface of the ring and in this way cool the surface of the ring since the guiding means is positioned close to the surface of the ring. In this way, the surface of the ring is cooled and nearly all the cooling ability of the gas is used for cooling the surface, since the gas is not heated travelling through the housing before arriving to the surface of the ring.

Prior art solutions have focused on cooling the brushes, i.e. the whole brush. When a brush is worn down, the brush is depleted and the surface area of the brush decreases accordingly. When cooling on the brush, the cooling gas passes the surface area of the brush and, as the brush area and thus the cooling surface on the brush decreases, the cooling decreases accordingly. Such increasing wear over time is very unpredictable and thus not desirable.

By cooling the slip ring as in the present invention, instead of cooling on the brushes, more heat is transported away from the contact area between the conductive means and the slip ring surface. This is due to the fact that the slip ring of e.g. cobber is a better conductor of heat than the brush of e.g. carbon.

In addition, the surface of the conductive means, such as the brush, is also cooled down, but not the whole brush. Hereby, the area in which the heat is highest is cooled down and the wear on the brush is gradual and thus more predictable. Furthermore, the wear on the brushes is substantially reduced.

Furthermore, the high-speed gas is guided towards the surface of the slip ring and, as the ring rotates, the gas is led by the surface to follow the surface at least partly as the ring turns. In this way, the high-speed gas drags the heat away from the ring over a longer rotational distance than in prior art solutions. This is due to the fact that the gas is guided by the guiding means to flow over the surface of the ring at high speed and at a sufficiently small distance so that the surface of the ring is able to drive some of the gas at least partly around with the rotation.

Furthermore, the aperture of the guiding means of the suction inlet and the suction outlet may be positioned radially substantially opposite the surface of the slip ring so that the gas is forced to flow partly along the periphery of the slip ring.

By arranging both the guiding means of the suction inlet and the suction outlet in alignment with the surface of the slip ring, the gas sucked in through the inlet is directed along the surface of the slip ring and thereby provides an optimal cooling of the slip ring. Prior art tools may suck air out through an aperture situated axially displaced from the slip rings at the end of the housing; however due to this axial displacement, the air is forced to flow axially of the slip rings and thus not along the slip ring surface.

Furthermore, by arranging both the suction inlet and the suction outlet radially aligned with the surface of the slip ring, the particles generated by the abrasion of the brushes are maintained close to the slip ring surface before being sucked out of the slip ring housing. In this way, the particles from the brushes are not given the opportunity to deposit on other elements inside the slip ring housing. These particles have been known to have negative influences on the other electronic components.

In one embodiment, the guiding means may guide the gas in a direction radial to the slip ring unit.

By guiding the gas in a radial direction, the gas is led directly towards the surface of the ring and travels the smallest possible distance. Thus, the gas is not heated by its surroundings as is the case in prior art solutions where the gas is led into the space of the housing from one end and out through the bottom of the slip ring assembly. Furthermore, the gas is not slowed down, and the gas thus passes the slip rings at a high speed in order to cool the rings maximally.

Furthermore, the slip ring assembly may comprise a first filter positioned to filtrate the gas before the gas enters the housing.

By having a filter, any polluting fragments from outside the housing of the slip ring assembly is prevented from interfering with the function of the slip ring assembly.

In addition, the slip ring assembly may further comprise a second filter positioned to collect dust and the like from the gas leaving the housing.

When having a second filter, released particles of e.g. granite having conductive abilities are not circulated outside the housing and thus do not settle on electrical components having a harmful effect on their function.

Advantageously, the predetermined distance may be between 5-60 mm, preferably between 10-50 mm, more preferably between 20-40 mm.

Hereby, the gas is lead sufficiently close to the surface of the ring in order to substantially reduce the wear on the brush.

In one embodiment, the guiding means may taper towards the surface of the slip ring.

In this way, the suction of gas from the tip of the guiding means has been substantially increased without increasing the size of the suction means.

In another embodiment, the aperture may have an extension across the width of the slip ring and the extension may be between 10-100% of the diameter of the slip ring, preferably between 20-60%, more preferably between 20-40%.

Hereby, a spot cooling is obtained so that the cooling effect of the gas is substantially increased.

Furthermore, the suction outlet may be in connection with a second guiding means extending from the suction outlet towards the surface of the slip ring, and the second guiding means may have a second aperture positioned at a second predetermined distance from the surface of the slip ring.

In this way, the gas is forced along the surface of the slip ring and down to the bottom and out through the suction outlet.

In another embodiment, the second guiding means may be positioned at a distance from the first guiding means along the surface of the slip ring at an angle of 95-270°, preferably at an angle of 150-210°, more preferably at an angle of 170-190°.

As the slip ring rotates, the surface of the slip ring is able to pull the gas around to a certain point along the circumference of the slip ring. Beyond that point, the gas continues its path in a tangential direction of the slip ring. When the second guiding means is positioned at a distance from the first guiding means along the surface of the slip ring at an angle of 95-270°, the suction means is able to keep the gas close to the surface somewhat beyond that point and the surface is thus cooled even further.

In addition, by having the second guiding means positioned at a distance from the first guiding means along the surface of the slip ring at an angle of 95-270°, the velocity of the gas is substantially increased closer to the surface of the slip ring, and the cooling of the surface is thus increased.

In addition, the second aperture may have an extension across the width of the slip ring, and the extension of the second guiding means may be between 20-120% of the diameter of the slip ring, preferably between 30-80%, more preferably between 35-55%.

Furthermore, the aperture may have a substantially rectangular cross-section with a length extending along the centre axis and a width or extension between 10-100 mm, preferably between 25-80 mm, and more preferably between 40-60 mm.

In another embodiment, the aperture may have an oval cross-section with an overall width between 10-100 mm, preferably between 25-80 mm, and more preferably between 40-60 mm.

In addition, the slip ring may comprise at least one groove according to yet another embodiment of the invention.

Having at least one groove increases the surface of the slip ring, and the groove functions as a kind of cooling rib. The increased surface area results in an increased cooling of the ring, and also an increased surface to lead the gas along with the rotation.

According to the invention, the ring may comprise a rim projecting radially outwards from the slip ring unit on each side of the slip ring.

By having a projecting rim on each side of the ring, the gas is led through an open channel and the cooling area of the ring is increased resulting in a better cooling of the slip ring.

According to another embodiment of the invention, the second guiding means tapers from the suction outlet towards the slip ring unit in the radial direction.

Hereby, the travelling of the gas around with the slip ring surface is increased in that the gas closest to the surface is slowed more and more down until a certain point and, when passing that certain point, the suction force takes over and the gas velocity is substantially increased close to the surface in order to cool the surface even more.

In another embodiment, the second aperture has a substantially rectangular cross-section with a length extending along the centre axis and a width between 10-150 mm, preferably between 40-120 mm, and more preferably between 60-100 mm.

According to yet another embodiment of the invention, the suction means may be a pump, such as a centrifugal pump, a piston pump, a jet pump, or the like pump.

Furthermore, the slip ring assembly may comprise a plurality of slip rings and the one guiding means may guide the gas to each slip ring.

In another embodiment, each slip ring may have a guiding means for guidance of gas to that slip ring.

The invention also relates to a generator comprising a slip ring assembly as described above.

Finally, the invention relates to a wind turbine comprising a slip ring assembly as described above.

BRIEF DESCRIPTION OF THE DRAWINGS

The invention and its many advantages will be described in more detail below with reference to the accompanying schematic drawings which, for the purpose of illustration, show some non-limiting embodiments and in which.

All the drawings are schematic and not necessarily to scale, and they show only those parts necessary to elucidate the invention, other parts being omitted or merely suggested.

DETAILED DESCRIPTION OF THE INVENTION

Figure 1:
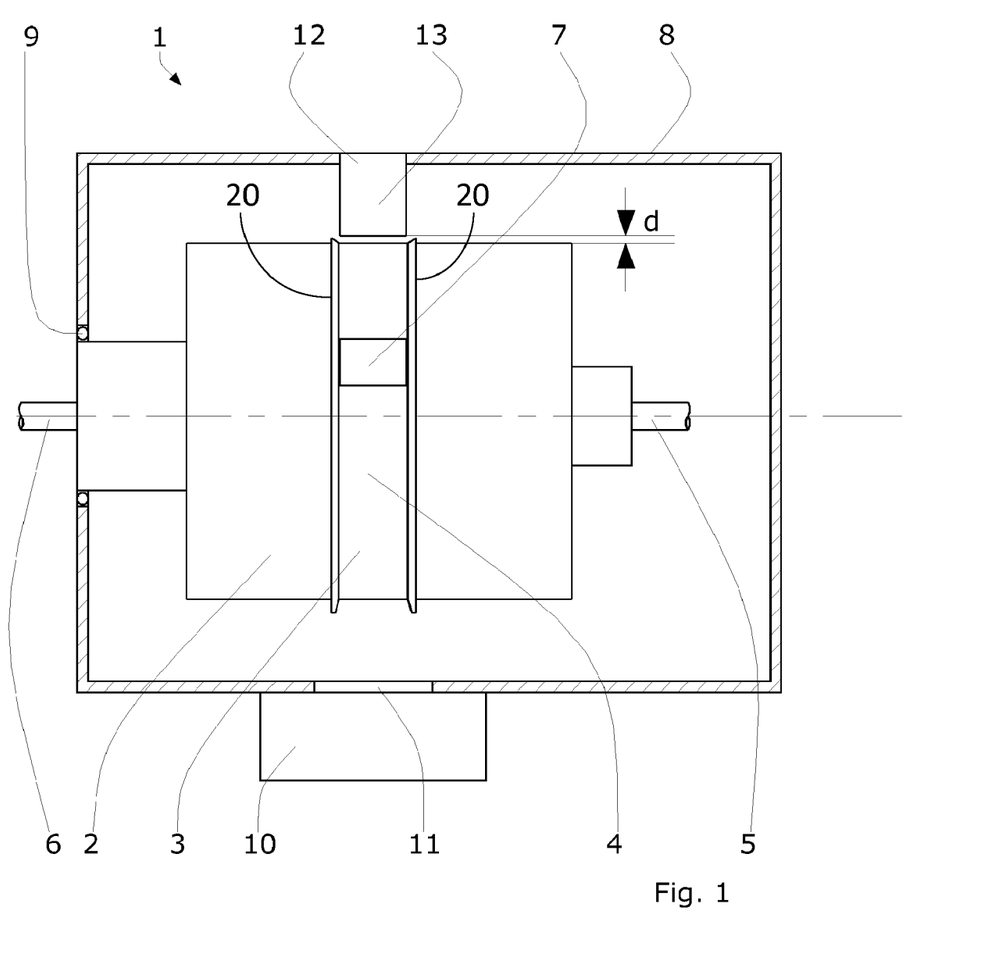
FIG. 1 shows a partly cross-sectional view of a slip ring assembly according to the present invention seen along its axial extension.

In FIG. 1, a slip ring assembly 1 according to the invention is shown. When in use, the slip ring assembly 1 provides electricity to a rotating part, such as a rotor rotating in relation to a stator in a generator or another electrical machine. The slip ring assembly 1 comprises a slip ring unit 2 having at least one slip ring 3 with an outer surface 4. The slip ring 3 is situated in the slip ring unit 2 and is typically fastened when moulding the unit. In one end of the slip ring unit 2, a centre bar 6 protrudes from the unit 2 for transferring of electricity to the rotor. Thus, the slip ring assembly 1 is able to rotate around a centre axis which coincides with the centre axis of the shaft 5 and the centre axis of the centre bar 6.

As shown in FIG. 1, the slip ring assembly 1 comprises a conductive means 7 in the form of a brush 7. In order to transfer electricity to the rotor, the brush has a sliding conductive contact with the surface 4 of the slip ring. The slip ring unit 2 and the conductive means 7 are situated within a housing 8. The housing 8 is penetrated in one end by the end of the slip ring unit 2 having the centre bar 6. The one end of the slip ring unit 2 is rotationally connected with the housing 8 by means of a bearing 9, such as a ball bearing 9.

Furthermore, the housing 8 has a suction inlet 12 and a suction outlet 11. The housing 8 is connected with a suction means 10 for suction of gas, such as air surrounding the housing, in through the housing 8 and out through a suction outlet 11. The slip ring assembly 1 further comprises a guiding means 13 provided in fluid communication with the inlet 12 of the housing. Gas is sucked into the housing 8 through the inlet 12 via the guiding means 13 and out through the outlet 11 by means of the suction means 10 positioned outside the housing. The guiding means 13 is positioned at a predetermined distance d from the surface 4 of the slip ring 3 for guiding the gas along at least a part of the surface 4 of the slip ring 3. Hereby, the gas is directed towards the surface 4 of the slip ring 3 in order to cool the surface. Due to the fact that the gas is guided nearly all the way to the surface 4, the air is held separated and is not heated by passing the space within the housing 8 before arriving to the surface. In prior art solutions, the gas is let in axially and is led through a long duct to the slip ring unit 2 and thus has to travel through a lot of air within the housing 8 before arriving at the surface 4 of the slip ring 3.

In addition, the gas having a high velocity is guided directly to the surface 4 of the slip ring 3 and, as the ring rotates, the gas is led by the surface 4 to follow at least partly as the ring turns, and the surface 4 is thus cooled down. In this way, the high-speed gas drags the heat away from the ring over a longer rotational distance than in prior art solutions. This is due to the fact that the gas is guided by the guiding means 13 to flow over the surface 4 of the ring at a sufficiently small distance so the high-speed gas does not lose any substantial speed and that the surface 4 of the ring is able to drive some of the gas at least partly around with the rotation.

By having suction means sucking gas out of the housing and not blowing gas in at the same time, a negative pressure is created within the housing. Furthermore, the gas sucked in through the inlet is directed along the surface of the slip ring by having both the guiding means of the suction inlet and the suction outlet in radial alignment with the slip ring. Thus, the particles generated by the abrasion of the brushes are maintained close to the slip ring surface before being sucked out of the slip ring housing. In this way, the particles from the brushes are not given the opportunity to deposit on other elements inside the slip ring housing. In prior art, the gas is led axially to the slip ring unit and not maintained close to the slip ring surface, and the particles may therefore deposit or simply hit against an obstacle within the housing and be slowed down to fall down onto other electronic components.

By cooling the slip ring 3 according to the invention, the surface of the conductive means 7, such as the brush, is also cooled down, instead of the whole brush. Hereby, the area in which the heat is highest is cooled down and the wear on the brush is gradual and thus more predictable than in prior art solutions. Furthermore, the wear on the brushes is substantially reduced.

In FIG. 1, the guiding means 13 is shown as a channel extending from the inlet 12 of the housing 8 towards the surface 4 of the slip ring 3. In this embodiment, the slip ring 3 is provided with two radially projecting rims 20, 20, one on each side of the ring, in the form of guiding rails. In this way, the gas is led through a kind of open channel as it follows the rotation of the ring. Furthermore, the rims 20, 20 provide an increased surface distance between the conductive means 7 and thus an electrical creeping distance so as to prevent electrical flash-over.

The predetermined distance d has to be small enough for the gas to cool the surface 4 sufficiently down and to follow the surface 4 of the ring during rotation. In one embodiment, the predetermined distance d is between 5-60 mm, preferably between 10-50 mm, more preferably between 20-40 mm. Thus, the gas is led sufficiently close to the surface 4 of the ring to reduce the wear on the brush substantially. However, tests have shown that a distance between 20-40 mm reduces the wear more than a smaller distance.

The suction means 10 is in this embodiment a centrifugal pump. However, the suction means 10 may be any kind of pump, such as a jet pump, piston pump, or the like pump.

Figure 2:
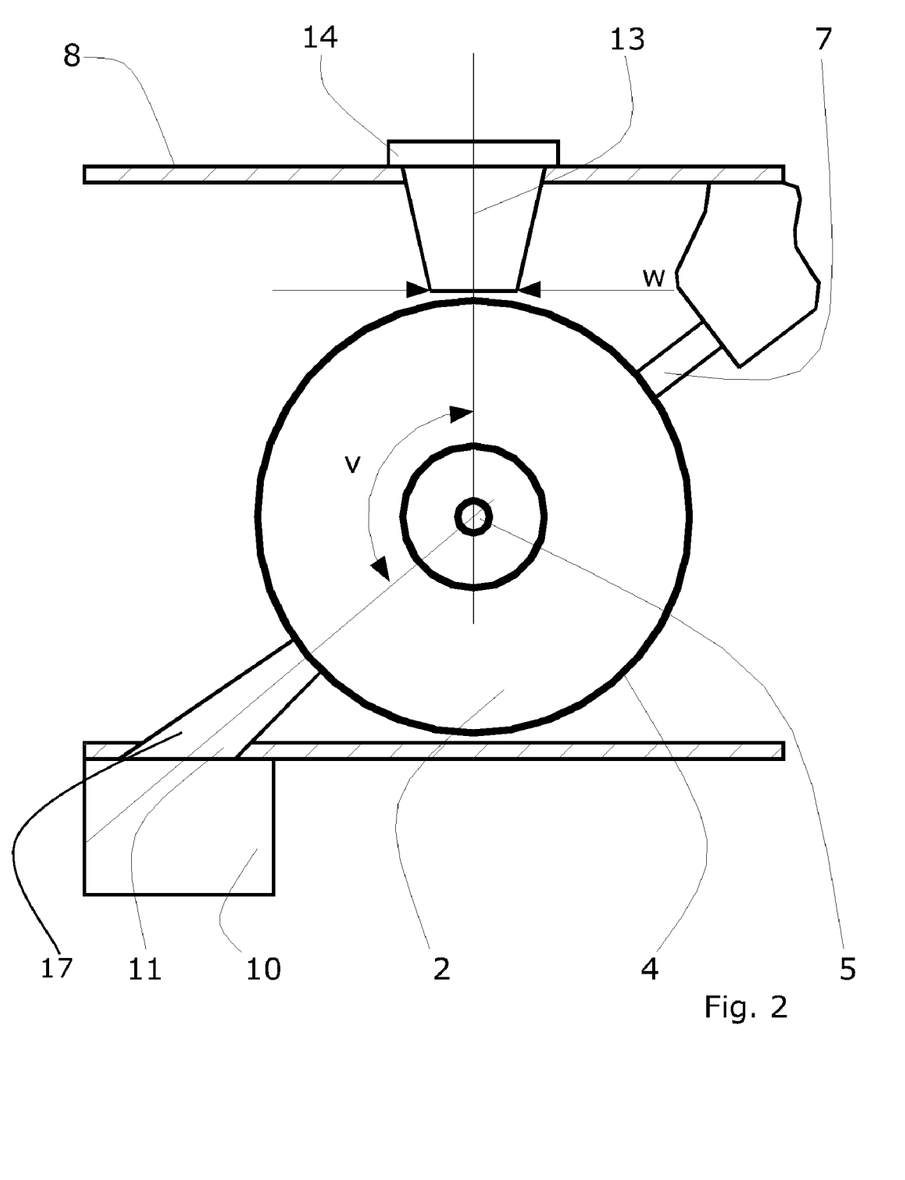
FIG. 2 shows a partly cross-sectional view of an embodiment of the slip ring assembly according to the invention seen from one end.

In FIG. 2, the slip ring assembly 1 is seen from the end opposite the rotor. In this embodiment, the guiding means 13 guides the gas in a radial direction from the inlet 12 to the slip ring unit 2. The guiding means 13 tapers towards the surface 4 of the slip ring 3 in order to guide the gas towards the surface 4 of the slip ring 3. Hereby, the velocity of gas from the tip of the guiding means 13 has been substantially increased.

The slip ring assembly 1 has a first filter 14 positioned before the guiding means 13 so that the gas is filtrated before entering the housing. The slip ring assembly 1 may also comprise a second filter 15 between the suction outlet 11 and the suction means 10, so that dust released from the brushes, such as carbon or graphite debris, is collected and not circulated outside the housing 8. In some embodiments, the suction means 10 may be placed at a distance from the housing 8 and the gas may be led through a tube from the outlet 11 of the housing to the pump.

In one embodiment, the suction outlet 11 is in fluid communication with a second guiding means 17 tapering towards the slip ring 3 in the radial direction. The velocity of the gas closest to the surface 4 is reduced still more until a certain point upon which the gas travels away from the surface. By having a second guiding means 13, the velocity and way which the gas travels around with the surface 4 is increased since, when passing the certain point, the suction force takes over and increases the gas velocity and helps the gas to stay close to the surface 4 in order to cool the surface 4 even more.

In this embodiment, the second guiding means 17 is positioned at a distance from the first guiding means 13 along the surface 4 of the slip ring 3 at an angle v approximately between 110-150°. In another embodiment, the angle v is between 95-270°, preferably between 150-210°, more preferably between 170-190°. The position of the second guiding means 17 depends on the suction ability of the suction means 10 and the possible obstructions between the guiding means 13 and the suction outlet 11. A typical obstruction may be the conductive means.

The high-speed gas is slowed down by the surface 4 of the slip ring 3 to a certain point after which the gas continues in a path tangential to the slip ring surface. By having the second guiding means 17 positioned at a distance from the guiding means 13 along the surface of the slip ring 3 at an angle of 95-270°, the velocity of the gas is substantially increased closer to the surface of the slip ring, and the cooling of the surface is increased.

In one embodiment, the second guiding means 17 has a second aperture with a substantially rectangular cross-section with a length extending along the centre axis and a width or extension between 10-150 mm, preferably between 40-120 mm, and more preferably between 60-100 mm.

The guiding means 13 has an aperture facing the surface 4 of the slip ring 3, which aperture is an elongated aperture with an extension w across the width of the slip ring 3 as shown in FIG. 2. In one embodiment, the aperture has a substantially rectangular cross-section with an extension w between 10-100 mm, preferably between 25-80 mm, and more preferably between 40-60 mm. In another embodiment, the aperture has an oval cross-section with a extension w also in the range of 10-100 mm.

In one embodiment, the aperture of the second guiding 17 means has a width between 70-90 mm and the first aperture of the first guiding means 13 positioned just above the slip ring 3 has an extension w between 40-60 mm. Hereby, the cooling efficiency of the same amount of gas and the same suction power as in prior art solutions has been increased with 40%.

In another embodiment, the extension w of the first guiding means 13 is between 10-100% of the diameter of the slip ring 3, preferably between 20-60%, more preferably between 20-40%. The width of the second guiding means 17 is between 20-120% of the diameter of the slip ring 3, preferably between 30-80%, more preferably between 35-55%. The predetermined distance is between 5-50% of the diameter of the slip ring 3, preferably between 10-40%, more preferably between 10-25%.

The conductive means 7 is held in contact with the surface 4 of the slip ring 3 in order to conduct electricity by means of a holder.

Even though the guiding means 13 are shown as extending radially from the centre axis of the slip ring unit 2, the guiding means 13 may, in another embodiment, extend in an angle from the slip ring unit 2 so that the gas meets the surface 4 of the slip ring 3 in a more tangential direction.

Figure 3:
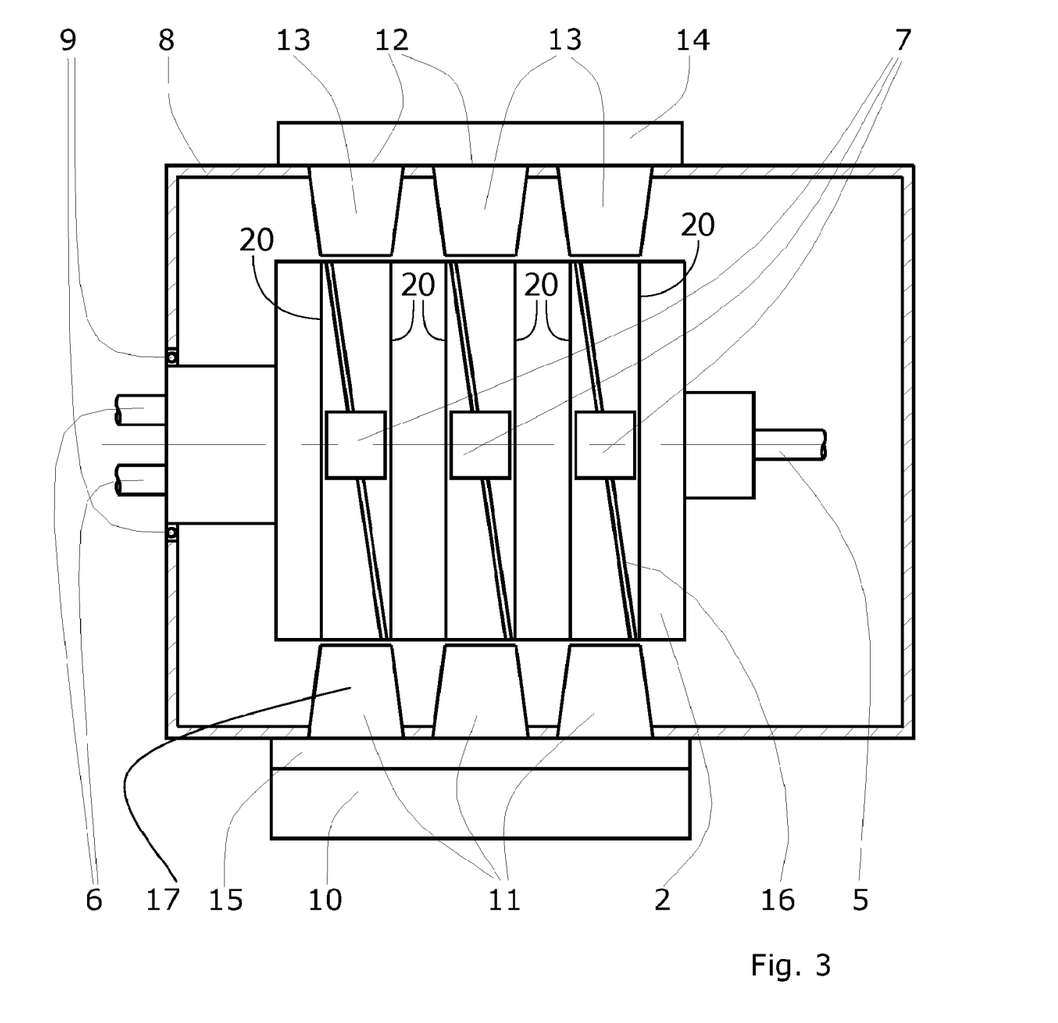
FIG. 3 shows a partly cross-sectional view of another embodiment of the slip ring assembly.

As shown in FIG. 3, the slip ring assembly 1 has a plurality of slip rings 3, in this embodiment three slip rings—one for each electrical phase. Furthermore, each slip ring 3 has at least one groove 16. By having such a groove 16 in the surface, the surface 4 area of the ring is substantially increased and thus also the cooling ability of the gas.

Figure 4:
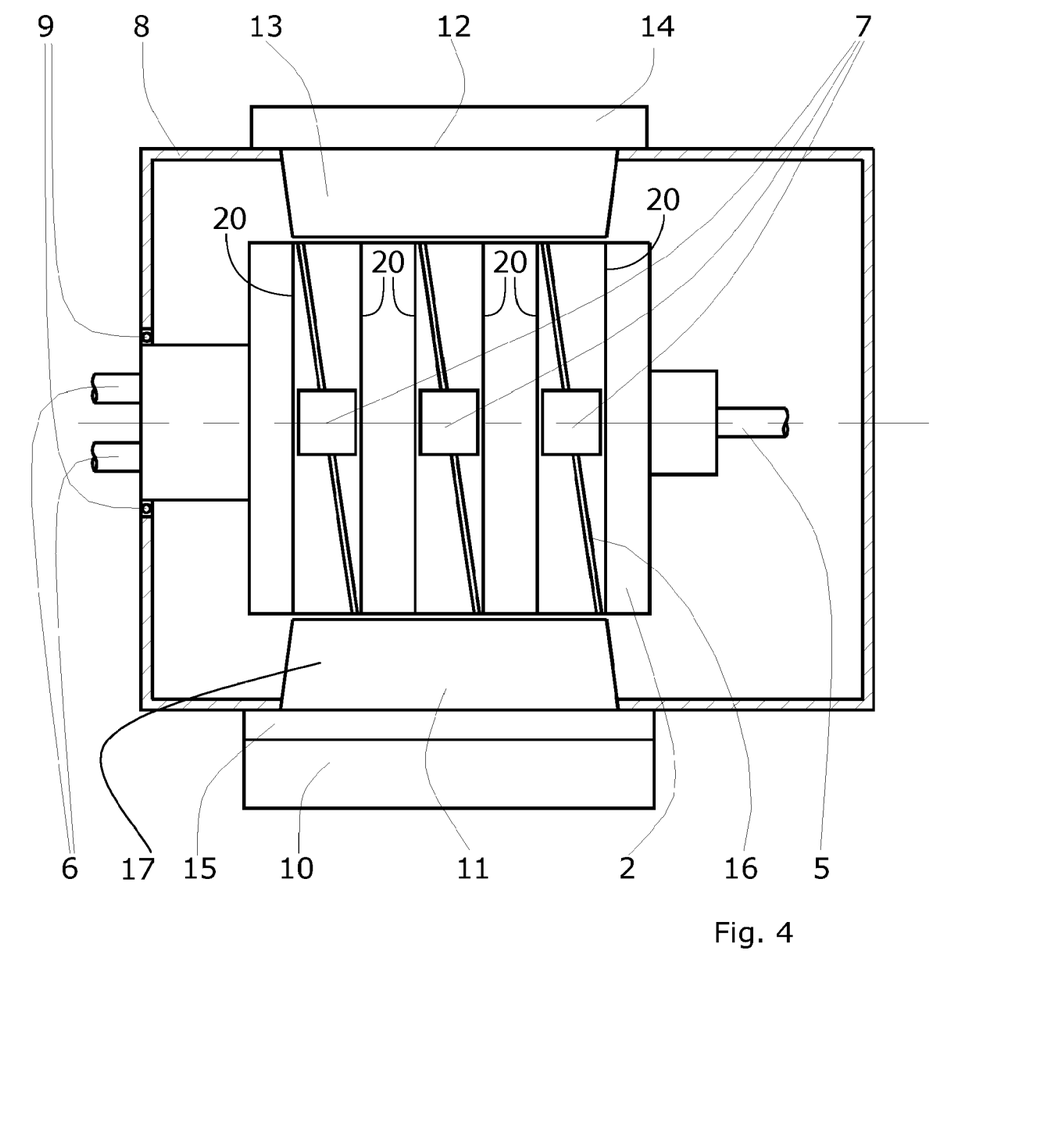
FIG. 4 shows a partly cross-sectional view of yet another embodiment of the slip ring assembly.

In FIG. 3, the slip ring assembly 1 has three guiding means 13 so that each slip ring has a guiding means 13. In FIG. 4, the slip ring assembly 1 has only one guiding means 13 extending over all three slip rings 3 and guiding gas to all slip rings simultaneously. In another embodiment, the guiding means 13 guides gas to more than three rings 3, e.g. two slip rings for each phase.

The guiding means 13 may have any shape suitable for guiding gas from one point to another. Thus, the guiding means 13 may be an open or a closed channel, a tube, a pipe, or the like guiding means 13.

In order to ensure a lower pressure within the housing 8 than outside the housing, the slip ring assembly 1 may comprise a one-way valve at the inlet 12.

The conductive means 7, such as brushes, can be made from any kind of conductive material, such as graphite, carbon, stainless steel, silver, or copper, or a mixture thereof. Either the surface of the brush 7 facing the conductive ring 3 or the whole brush may be wetted or alloyed with another material, such as mercury, metal powders, or solid lubricants like $MoS_2$, $SiO_2$. The conductive means 7 may have any shape or form, such as a block, wire, strip, or a mesh.

The conductive ring or band 3 of the rotating unit of the slip ring unit 2 can be made of any kind of conductive material which also has a high thermal conductivity and hardness, such as brass or copper.

The slip ring assembly 1 may be used in any kind of generator comprising both a rotating stator and a rotating rotor, such as a double-fed induction generator, a cascade-regulated generator, an alternator, or a synchronic generator. The slip ring assembly 1 may also be used in an electrical motor.

A generator comprising such a slip ring assembly 1 may be used in any type of wind turbine and therefore also in plurality of wind turbines constituting a wind turbine park.

By a wind turbine is meant any kind of apparatus able to convert wind power into electricity, such as a wind generator, wind power unit (WPU), or wind energy converter (WEC).

Although the invention has been described above in connection with preferred embodiments of the invention, it will be evident for a person skilled in the art that several modifications are conceivable without departing from the invention as defined by the following claims.

The invention claimed is:

1. A slip ring assembly for providing electricity to or from a rotor rotating in relation to a stator in a generator or an electrical motor, comprising:
   a slip ring unit rotating around a centre axis and having at least one first slip ring with an outer surface, a diameter, a periphery and a width, at least one conductive means having conductive contact with the surface of the slip ring, a housing in which the slip ring unit and the conductive means are situated, a suction means in connection with the housing for suction of gas from within the housing out through a suction outlet in the housing and causing a negative pressure within the housing, wherein the suction outlet is in connection with a second guiding means having a second aperture facing the slip ring surface, wherein the housing has a suction inlet which is in connection with a first guiding means, the first guiding means has a first aperture facing the slip ring surface, and the first aperture is positioned at a predetermined distance from the surface of the slip ring so that the gas is able to cool the surface of the slip ring, wherein the slip ring, the first aperture, and the second aperture are located in substantially the same axial location along the length of the centre axis.

2. The slip ring assembly as claimed in claim 1, wherein the second guiding means is positioned at a distance from the first guiding means along the surface of the slip ring at an angle of 95-270°.

3. The slip ring assembly as claimed in claim 2, wherein the second guiding means is positioned at a distance from the first guiding means along the surface of the slip ring at an angle of 150-210°.

4. The slip ring assembly as claimed in claim 3, wherein the second guiding means is positioned at a distance from the first guiding means along the surface of the slip ring at an angle of 170-190°.

5. The slip ring assembly as claimed in claim 1, wherein the first aperture of the first guiding means of the suction inlet and the second aperture of the second guiding means of the suction outlet are positioned radially substantially opposite the surface of the slip ring so that the gas is forced to flow partly along the periphery of the slip ring.

6. The slip ring assembly as claimed in claim 1, wherein the first guiding means guides the gas in a direction radial to the slip ring unit.

7. The slip ring assembly as claimed in claim 1, wherein the predetermined distance is between 5-60 mm.

8. The slip ring assembly as claimed in claim 7, wherein the predetermined distance is between 10-50 mm.

9. The slip ring assembly as claimed in claim 8, wherein the predetermined distance is between 20-40 mm.

10. The slip ring assembly as claimed in claim 1, wherein the first guiding means tapers from the suction inlet towards the surface of the slip ring.

11. The slip ring assembly as claimed in claim 1, wherein the first aperture has an extension across the width of the slip ring, and wherein the extension is between 10-100% of the diameter of the slip ring.

12. The slip ring assembly as claimed in claim 11, wherein the first aperture has an extension across the width of the slip ring, and wherein the extension is between 20-60% of the diameter of the slip ring.

13. The slip ring assembly as claimed in claim 12, wherein the first aperture has an extension across the width of the slip ring, and wherein the extension is between 20-40% of the diameter of the slip ring.

14. The slip ring assembly as claimed in claim 1, wherein the suction outlet is connected with the second guiding means extending from the suction outlet towards the surface of the slip ring, and wherein the second aperture of the second guiding means is positioned at a second predetermined distance from the surface of the slip ring.

15. The slip ring assembly as claimed in claim 1, wherein the second aperture has an extension across the width of the slip ring, and wherein the extension of the second guiding means is between 20-120% of the diameter of the slip ring.

16. The slip ring assembly as claimed in claim 15, wherein the second aperture has an extension across the width of the slip ring, and wherein the extension of the second guiding means is between 30-80% of the diameter of the slip ring.

17. The slip ring assembly as claimed in claim 16, wherein the second aperture has an extension across the width of the slip ring, and wherein the extension of the second guiding means is between 35-55% of the diameter of the slip ring.

18. The slip ring assembly as claimed in claim 1, wherein the slip ring comprises at least one groove.

19. The slip ring assembly as claimed in claim 1, comprising a plurality of slip rings and wherein the first guiding means guides the gas to each slip ring.

20. A generator comprising a slip ring assembly as claimed in claim 1.

21. A wind turbine comprising a slip ring assembly as claimed in claim 1.

22. A slip ring assembly for providing electricity to or from a rotor rotating in relation to a stator in a generator or an electrical motor, comprising:

a slip ring unit rotating around a centre axis and having at least one first slip ring with an outer surface, a diameter, a periphery and a width, at least one conductive means having conductive contact with the surface of the slip ring, a housing in which the slip ring unit and the conductive means are situated, a suction means in connection with the housing for suction of gas from within the housing out through a suction outlet in the housing and causing a negative pressure within the housing, wherein the housing has a suction inlet which is in connection with a guiding means, the guiding means has an aperture facing the slip ring surface, and the aperture is positioned at a predetermined distance from the surface of the slip ring so that the gas is able to cool the surface of the slip ring, wherein the slip ring comprises a rim projecting radially outwards from the slip ring unit on each side of the slip ring.

* * * * *